United States Patent
Breedt

(10) Patent No.: US 9,453,317 B2
(45) Date of Patent: Sep. 27, 2016

(54) MARINE FENDER AND METHOD OF ASSEMBLY OF COMPONENTS OF SAME

(71) Applicant: Andries Lucas Breedt, Kent, WA (US)

(72) Inventor: Andries Lucas Breedt, Kent, WA (US)

(73) Assignee: Andries Lukas Breedt, Kent, WA (US)

( * ) Notice: Subject to any disclaimer, the term of this patent is extended or adjusted under 35 U.S.C. 154(b) by 0 days.

(21) Appl. No.: 14/812,007

(22) Filed: Jul. 29, 2015

(65) Prior Publication Data

US 2016/0060837 A1    Mar. 3, 2016

Related U.S. Application Data

(60) Provisional application No. 62/044,441, filed on Sep. 2, 2014.

(51) Int. Cl.
*E02B 3/26* (2006.01)
*E02B 3/28* (2006.01)

(52) U.S. Cl.
CPC ... *E02B 3/26* (2013.01); *E02B 3/28* (2013.01)

(58) Field of Classification Search
CPC ............ E02B 3/26; E02B 3/28; B63B 59/02
USPC .................................................. 405/212, 215
See application file for complete search history.

(56) References Cited

U.S. PATENT DOCUMENTS

| 4,072,022 | A | * | 2/1978 | Shimizu | E01D 19/02 114/219 |
|---|---|---|---|---|---|
| 4,343,258 | A | * | 8/1982 | Belvedere | E02B 3/26 114/219 |
| 4,910,280 | A | * | 3/1990 | Robbins, III | E02B 3/26 428/31 |
| 4,968,182 | A | * | 11/1990 | Westwell | E02B 3/064 405/215 |
| 5,220,879 | A | * | 6/1993 | Johnson | E02B 3/26 114/219 |
| 5,409,199 | A | * | 4/1995 | Kahmann | B29C 33/48 114/220 |
| 5,497,723 | A | * | 3/1996 | Chase | E02B 3/26 114/219 |
| 7,617,792 | B1 | * | 11/2009 | Pursley | E02B 3/26 114/219 |
| 2008/0184924 | A1 | * | 8/2008 | Atkinson | E02B 3/28 114/230.13 |
| 2010/0166502 | A1 | * | 7/2010 | DeMay | E02B 3/26 405/215 |
| 2012/0003050 | A1 | * | 1/2012 | DeMay | E02B 3/26 405/215 |

FOREIGN PATENT DOCUMENTS

WO    WO 8700223 A1 * 1/1987 ............... E02B 3/26

* cited by examiner

*Primary Examiner* — Frederick L Lagman

(57) ABSTRACT

This invention relates to a new marine fender, and relates to a method of assembly a fender. The fender is comprised of four quadrant sections that are conjoined at mating surfaces with tapered wedges inserted into tapered mortises formed at interrelated surfaces. This method of assembly enables an articulated cam action joint which dynamically interacts with kinetic impact energy. Preferably, the components are made from resilient material that is suitable for compression molding, and are approved for use in the marine environment. One preferred embodiment of the invention encircles a single piling. The fender can be positioned to float with changing water levels, and rotate upon impact. The marine fender can be installed on existing isolated and independent marine structures, such as monopiles and dolphins, with little or no modification of the structure.

4 Claims, 8 Drawing Sheets

MARINE FENDER AND METHOD OF ASSEMBLY OF COMPONENTS OF SAME

CROSS-REFERENCE TO RELATED APPLICATION

This application claims the benefit of U.S. Provisional Application No. 62/044,441, filed Sep. 2, 2014.

BACKGROUND OF THE INVENTION

1. Field of the Invention

The claimed invention relates to a new marine fender for absorption, deflection, or dissipation of kinetic impact energy that occurs when a waterborne vessel engages with a piling, dock, or other marine structure, and more specifically, relates to a marine fender suitable for a monopile, a dolphin, or open, over-water dock pilings. This invention also describes a method of assembly of a marine fender.

2. Description of Related Art

Monopiles and dolphins provide prime defense for piers and docks against runaway vessels. Monopiles and dolphins deflect ships and barges as they negotiate narrow waterways or hairpin turns. Monopiles and dolphins are also used for docking barges mid-channel for over-water loading and off-loading. The fender piles are known to be stiff and lack the capacity for large deflection which results in high reaction loads, resulting in vessel hull damage and frequent breakage of piling. Stacking used tires on monopiles is a known practice as they require no or little modification to the monopile. Tires are known for their poor shock absorbing properties; tires in the water swell, "roll up", tear, and abrade, needing frequent replacement that is costly in time, labor, and permitting. Environmental agencies are banning the use of tires and rubber products in the water as they are a source of pollution. Therefore, a suitable alternative to used tires as fenders is sought. Prior art describes linkable fenders that resists separation and can conform to odd angles, such as around a bow of a boat. The joiner is connecting strips inserted into channels in the periphery of the fender. Linkable fenders that are pliable enough to deform with hand pressure to insert a connecting strip lack the capacity for large deflection of tens of thousands of tons at any speed. Other prior art use joiners like inflatable pneumatic sleeves or rope. Fenders joined with inflatable pneumatic sleeves can puncture and deflate. Fenders joined with ropes cannot hold in position in the wake of shipping traffic. Prior art discloses an apparatus for protecting a bridge pillar that uses pivoting elastic connectors to hold cushioning pads in position. This apparatus is too complex and expensive for a monopile and would require extensive retrofitting. Prior art discloses a shock absorbing open-ended cylindrical fender formed of polyurethane layers of different durometers. Polyurethane is toxic and current pollution prevention policies ban its use in the water. If the piling with such a fender needs repair, the fender would be costly and time consuming to remove and replace. Prior art discloses a modular bumper with attachment rail configured to either receive an associated molding that slides on or have the molding snap fit over the attachment rail. The attachment rail fixes the modular bumper into position in such a manner that the bumper would offer resistance upon impact, resulting in damage to the bumper, the piling and hull of the vessel. Prior art discloses a rotating hollow bumper assembly that can be split along one side or provided as two separate halves which can be secured by bolts, a band, or sliding, interlocking edges. The bumper rotates on a protective liner secured to the post. The protective liner is of a hardness to facilitate rotation and resist abrasion, adding to the piling's stiffness. There is a rotatable bumper in the prior art described as a boat mooring assembly comprising spring joints. The rotatable bumper alone has little capacity to absorb substantial impact energy and must be attached to the boat mooring assembly and dock. Prior art of marine fenders and fender systems teach a variety of construction, materials, and shapes to accommodate many types of fendering situations, but no prior art is heretofore suitable to replace used tires on existing monopiles and similar marine structures.

The inventor, a tool maker by trade, was approached in 2010 by Washington State Maritime Industry facility managers and administrators to consider an improved marine fender to replace used tires and recycled tire products on existing monopiles, dolphins, and over-water dock pilings. The improvement would be a fender that is simple to use and produce. Another consideration is that the fender installation would not require structural changes to existing marine structures. Preferred material is approved for use in marine habitats. The improved fender is cost-effective and environmentally-sound to install, inspect, maintain, or repair. Prototype construction of this marine fender was requested by Washington State Department of Ecology under contract #C1500137 in partnership with the Governor's Office for Maritime Industry and the Port of Seattle.

The claimed invention is marine fender which is specifically advantageous to compression-molded manufacturing using resilient material. One consideration for resilient material is ethylene propylene diene monomer or EPDM, which is a synthetic elastomer. The preferred material is a no-zinc formula EPDM that is currently approved for use in marine environments, such as a propriety EPDM produced by M & R Profiles of Seligenstadt, Germany, which the inventor has secured exclusive licensing rights for the purpose of manufacturing marine products. The proprietary EPDM complies with the European Union's REACH regulations. The proprietary EPDM has excellent properties of durability, UV resistance, tear resistance, and abrasion resistance.

BRIEF SUMMARY OF THE INVENTION

The claimed invention is a new marine fender comprising compression molded quadrants and tapered wedges which can be installed around an existing piling method of components of the marine fender. The claimed invention is also a method of assembly which enables an articulated cam action joint. One object of the invention is to provide an improvement over the use of tires on existing isolated and independent marine structures, such as monopiles, or dolphins.

The claimed invention is easy to install around a single piling without having to remove or otherwise alter the piling from its position. The components are cost-effective to inspect, replace, or repair. The invention can be produce in various sizes and thicknesses for use and applications in variety of fender systems, locations, and orientations, such as marinas, docks, shipyards, quays, shipping channels, and floating and fixed offshore foundations.

One preferred embodiment of the invention, a floating fender, can be utilized as a platform to attach self-generating lights, scientific measuring devices, or other devices.

The above and further objects of the claimed invention will become more readily apparent upon consideration of the following specification describing preferred embodiments of the invention, and of the drawings accompanying the specification and forming a part thereof, or may be learned through practice of the invention.

DETAILED DESCRIPTION OF THE DRAWINGS

Figure 1:
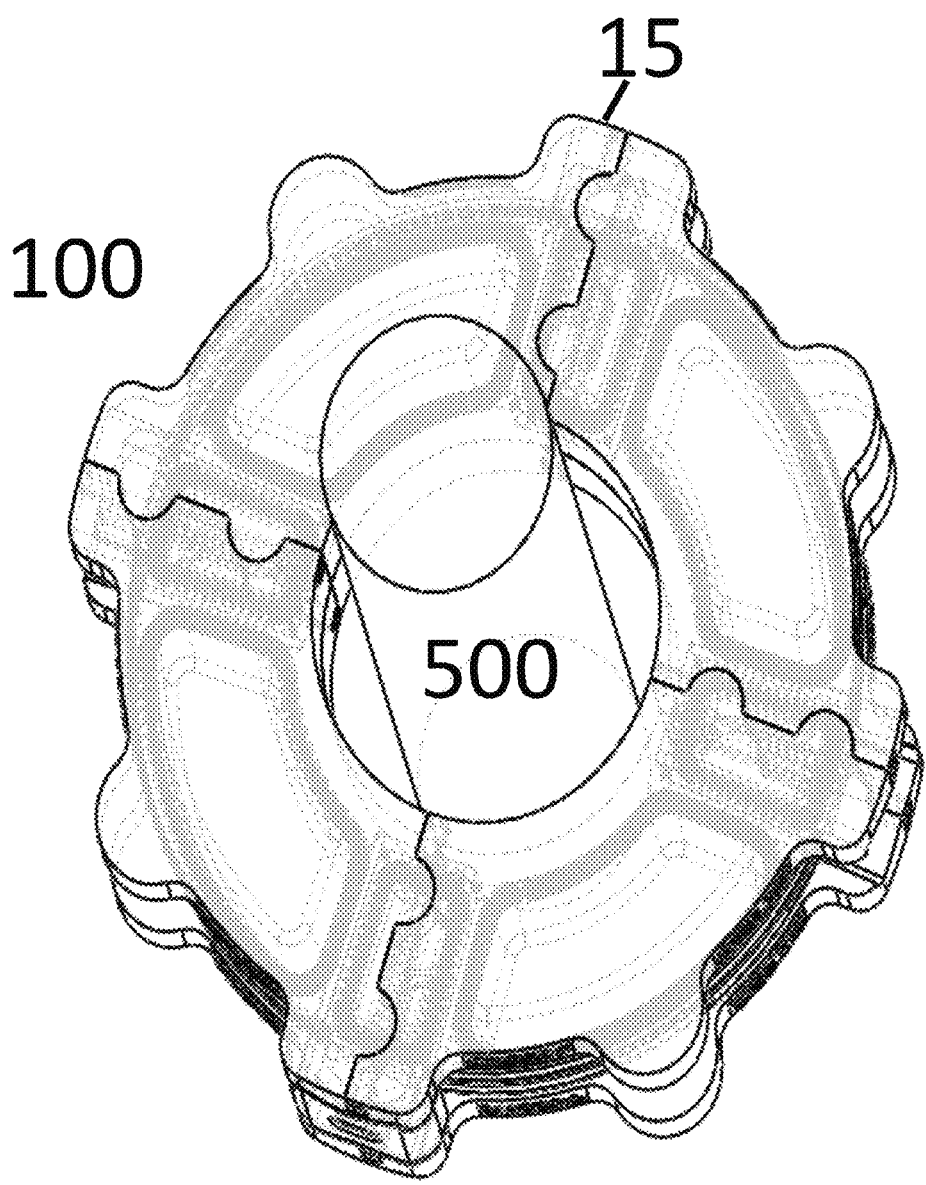
FIG. 1 is a view of a preferred embodiment as a floating fender.

FIG. 1 is a view of a preferred embodiment of the claimed invention as a completely assembled fender 100 encircling a piling 500. The fender comprises a plurality of components that are conjoined at mating surfaces 15. An assembly belt, preferably an environmentally friendly polymer, can circumscribe the completely assembled fender 100. The assembly belt can be secured with a buckle with cover. The components and buckle cover are compression-molded using a resilient material such as EPDM which can be cured to Shore A 80±durometer. It is preferred that the resilient material be approved for use in marine environments.

Figure 2:
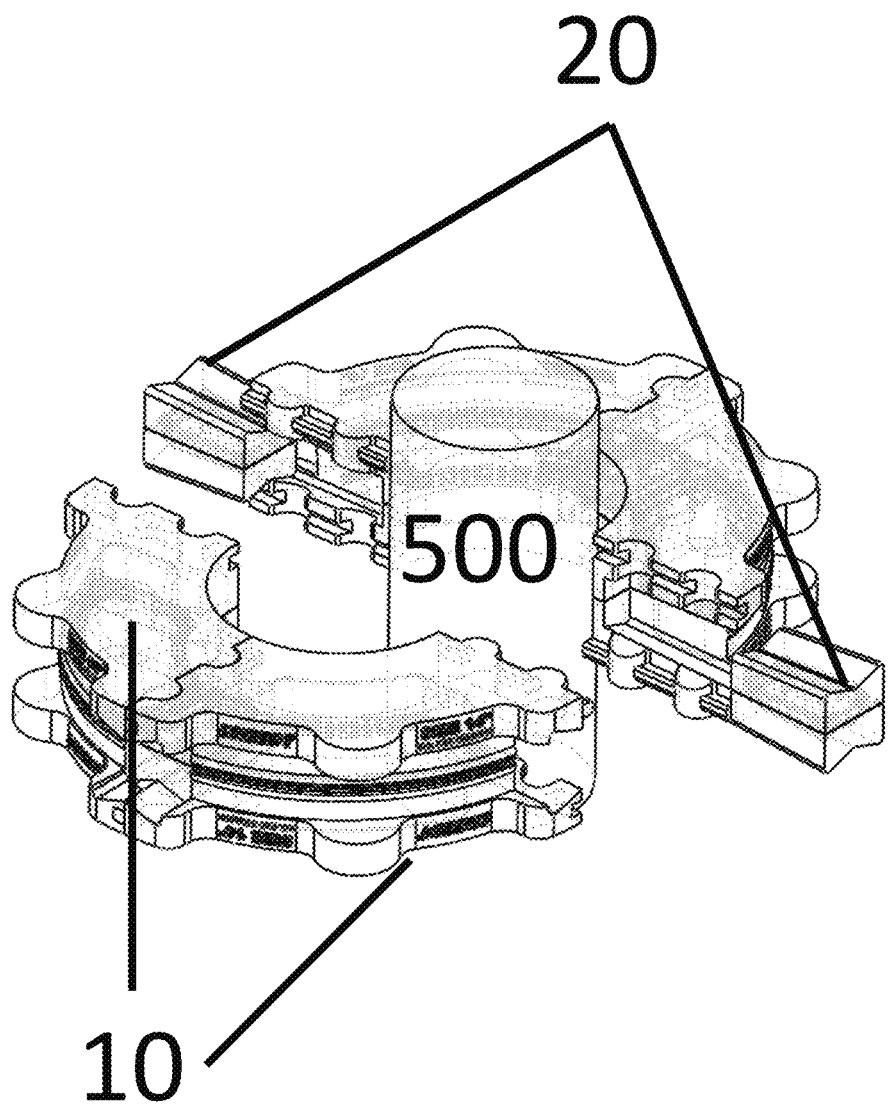
FIG. 2 is an exploded view of preferred mode of installation around a piling.

One preferred mode of installation for a floating fender is shown in FIG. 2. The quadrants sections 10 are conjoined at the mating surfaces 15, which form a tapered mortise 25. A tapered wedge 20 is then inserted into the tapered mortise 25. The completely assembled fender can be circumscribed with a polymer assembly belt that is fastened with a buckle and covered with a buckle cover.

Preferred dimensions of the completely assembled fender 100 can be 10 inches high (S.I. 25.4 cm) with 20 inches (S.I. 50.4 cm) inner diameter to accommodate a piling with a 14 to 18 inches (S.I. 35.56 cm to 45.72 cm) outer diameter. This allows for a space 2 to 6 inches (S.I. 5.06 cm to 15.24 cm) between the inner wall of the fender and the outer surface of the piling, creating an hydraulic cushion that aids in deflection of impact energy and rotation of the fender about the piling. The outer diameter of the fender 100 can be 44 inches (S.I. 111.76 cm).

Figure 3:
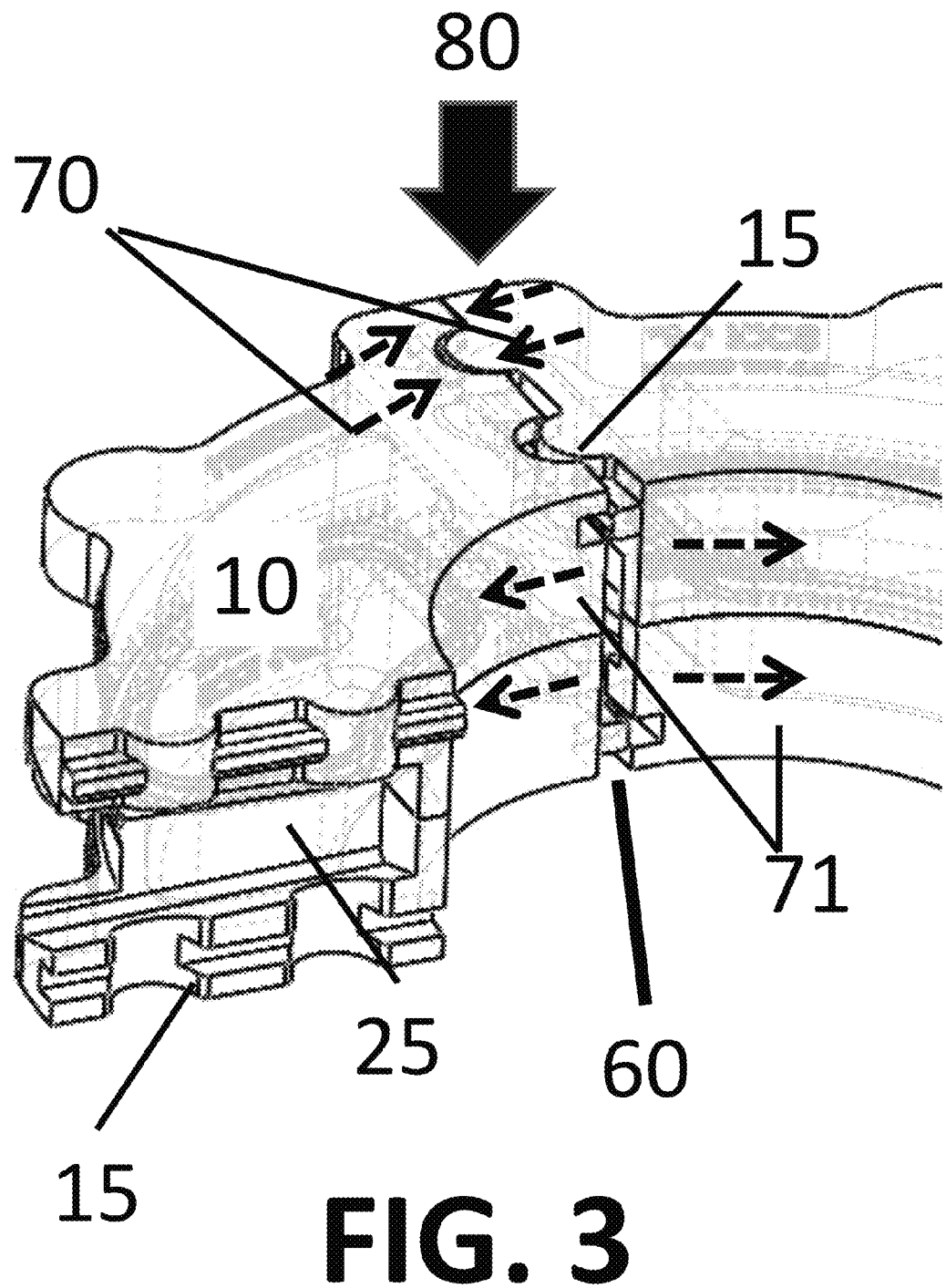
FIG. 3 is a view of the articulation from the inside wall of the fender.

FIG. 3 views a preferred method of assembly that enables an articulation 60 in the tapered mortise 25 between mating quadrants sections 10. When kinetic impact energy 80 is applied, the mating surfaces 15 can react with convergent movement 70 at the point of impact and divergent movement 71 along the inner wall of the fender.

Figure 4:
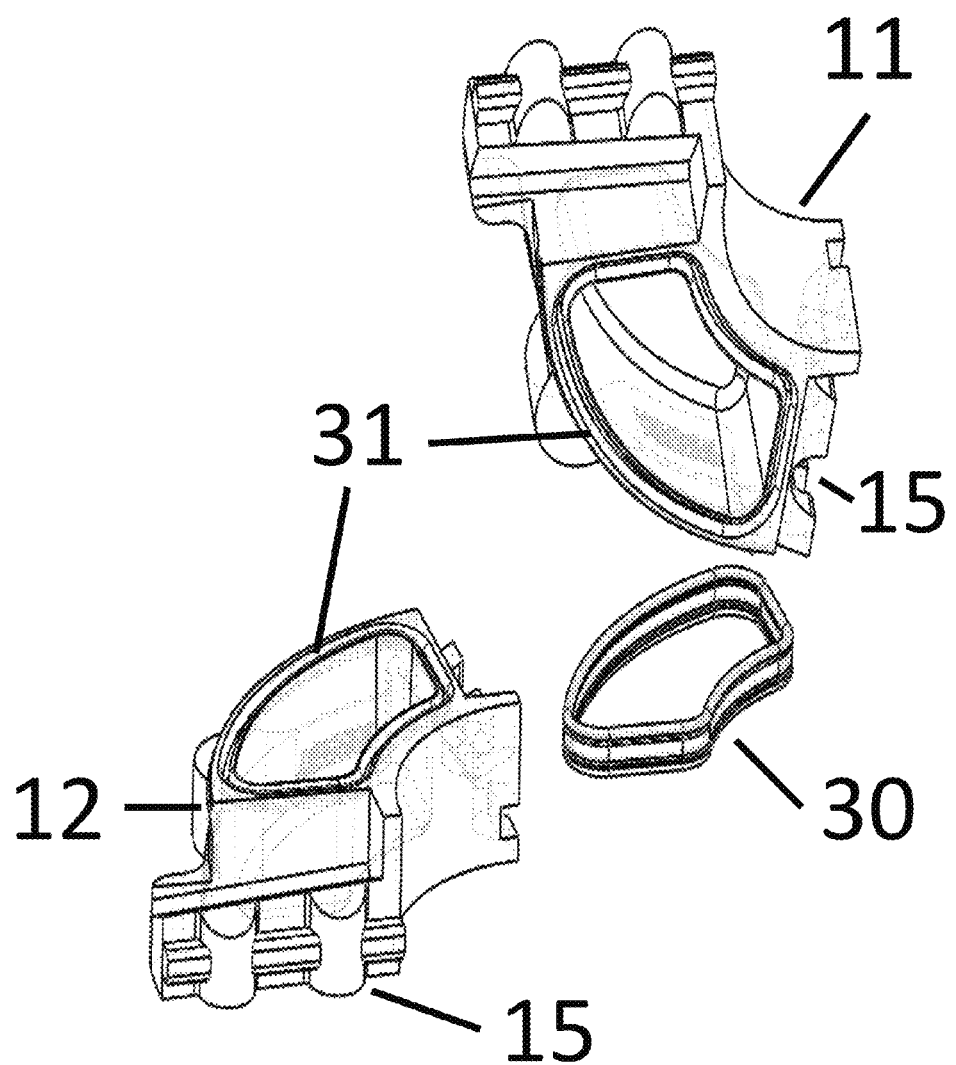
FIG. 4 is an exploded view of a quadrant section.

FIG. 4 is an exploded view of a assembly method fastening a quadrant top half 11 to its identical bottom half 12 by introducing one-side of double-tongued mechanical seal cord 30 into a groove 31 present in one half and the other side of said seal cord 30 into the a groove 31 present in the identical half. Then a 500 lb pressure is applied to outer surface of each half, the cord 30 compresses and slips into the groove 31. When pressure is relieved the cord 30 regains its shape inside the groove 31. The fastening can be adhesively enhanced.

Figure 5:
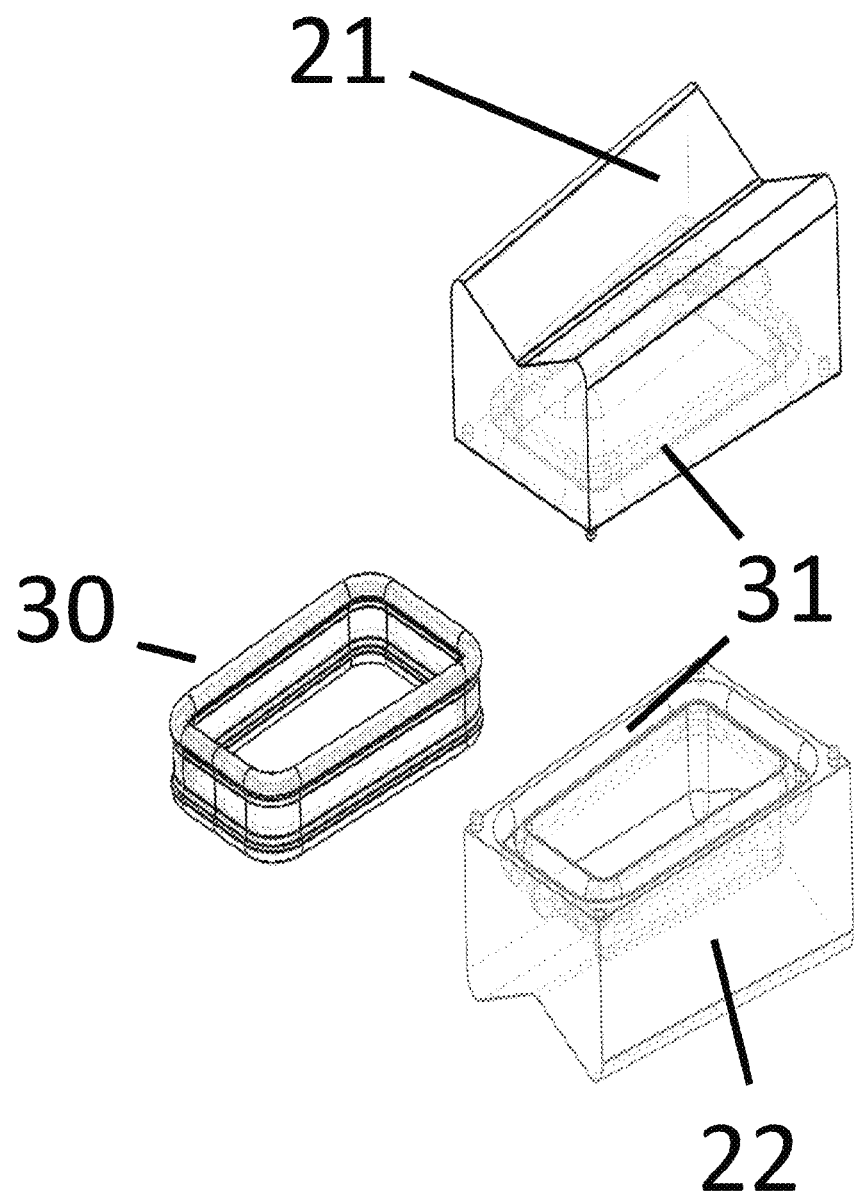
FIG. 5 is an exploded view of a tapered wedge.

FIG. 5 is an exploded view of a preferred assembly method fastening a tapered wedge top half 21 to its identical bottom half 22 by introducing one-side of double-tongued mechanical seal cord 30 into a groove 31 present in one half and the other side of said seal cord 30 into the a groove 31 present in the identical half. Then a 500 lb pressure is applied to outer surface of each half, the cord 30 compresses and slips into the groove 31. When pressure is relieved the cord 30 regains its shape inside the groove 31. The fastening can be adhesively enhanced.

Figure 6:
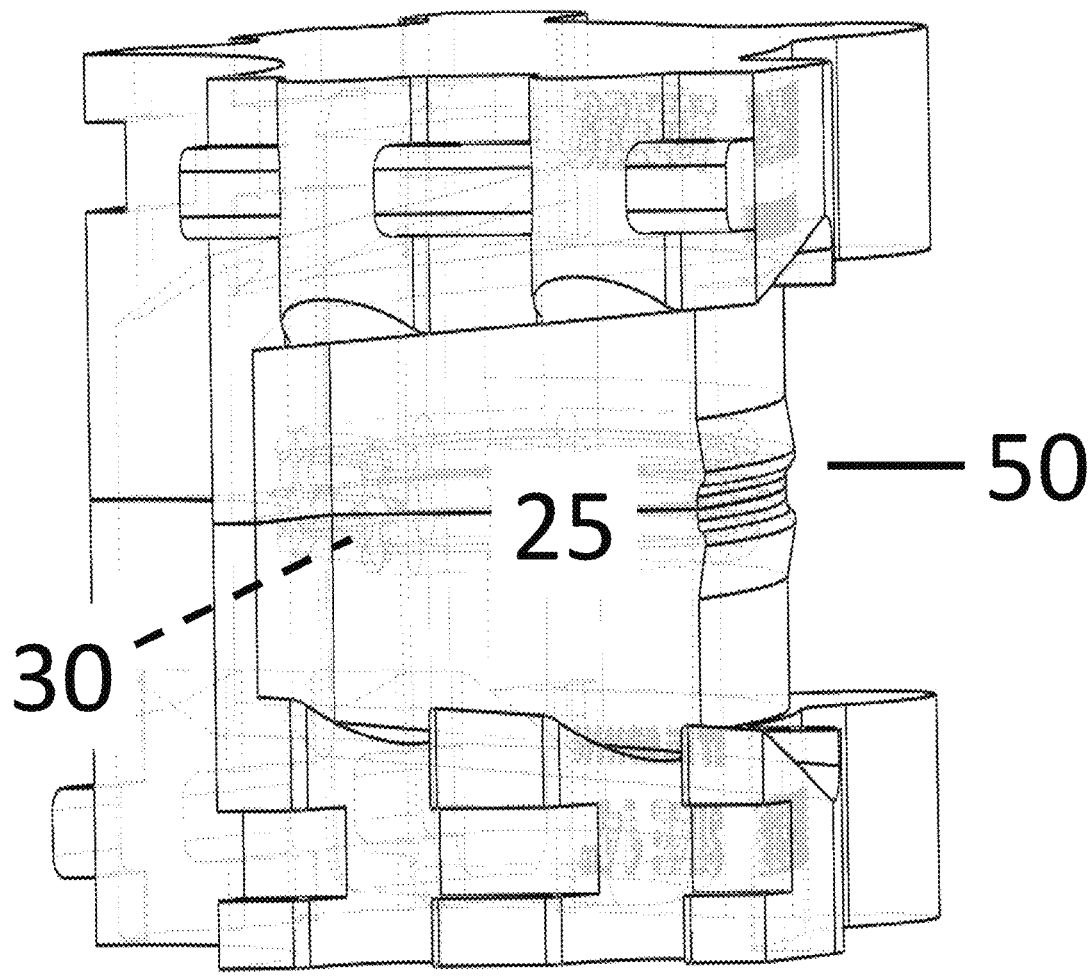
FIG. 6 is a cross-section view of the assembly belt track.

FIG. 6 shows that the quadrant section 10 can have an assembly belt track with a continuous raised rib-like boss 50 that is recessed into the quadrant section 10, and said boss 50 convergently reinforces the mechanical seal 30 when secured with an assembly belt and buckle and covered with a buckle cover.

Figure 7:
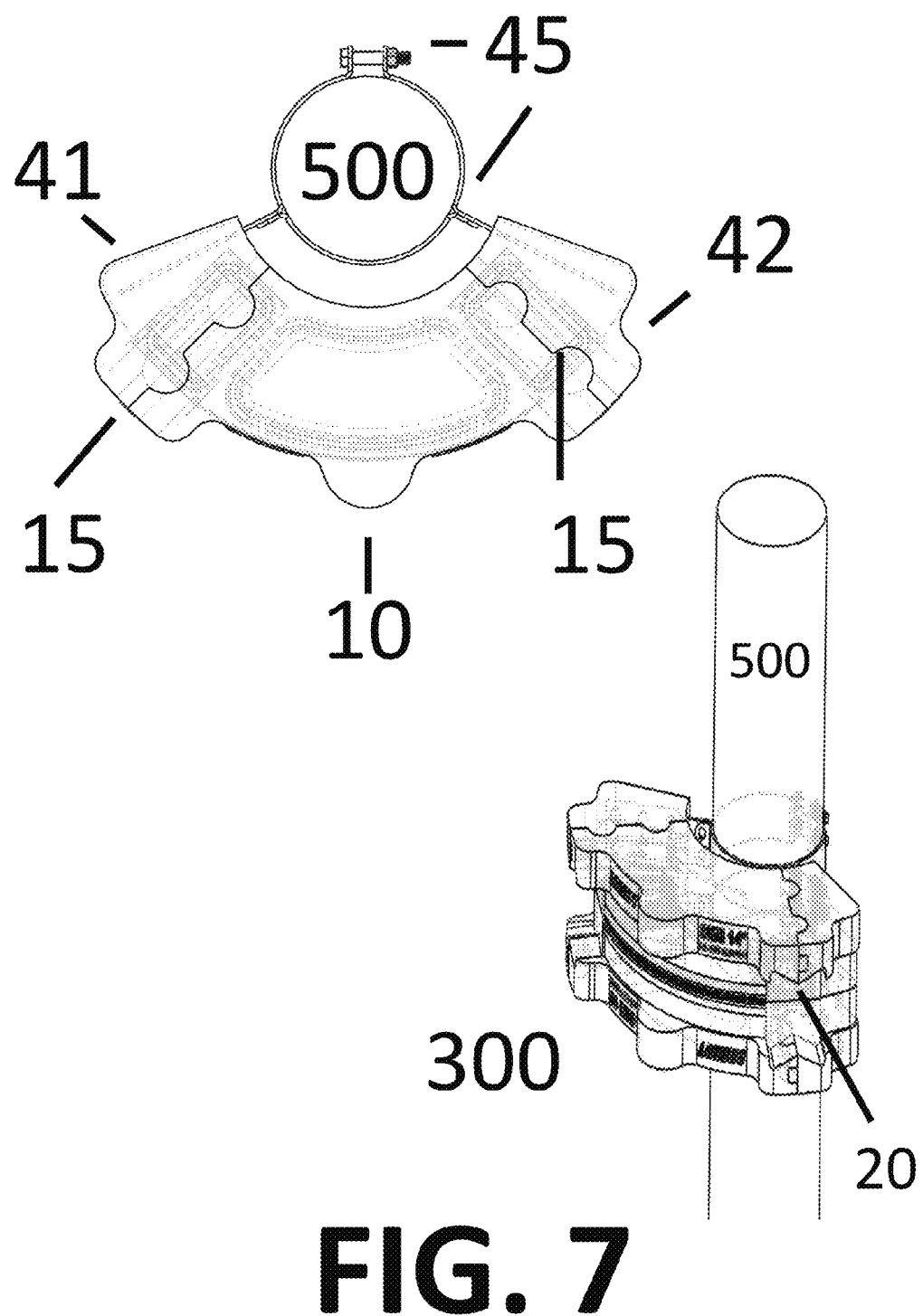
FIG. 7 is a view of a preferred embodiment using an end piece.

FIG. 7 views another embodiment of the claimed invention as a piling protector 300 comprising a member on the left 41 and a member on the right 42, each with a mating surface 15 proximate to quadrant section 10. The tapered wedge 20 is inserted in the tapered mortise 25 between quadrant sections 10 and members. The member on the left 41 and the member on the right 42, each have an imbedded steel strap 45 that can be wrapped around a piling 500 and fastened with a bolt. The piling protector 300 can be secured with an assembly belt and buckle and covered with a buckle cover.

Figure 8:
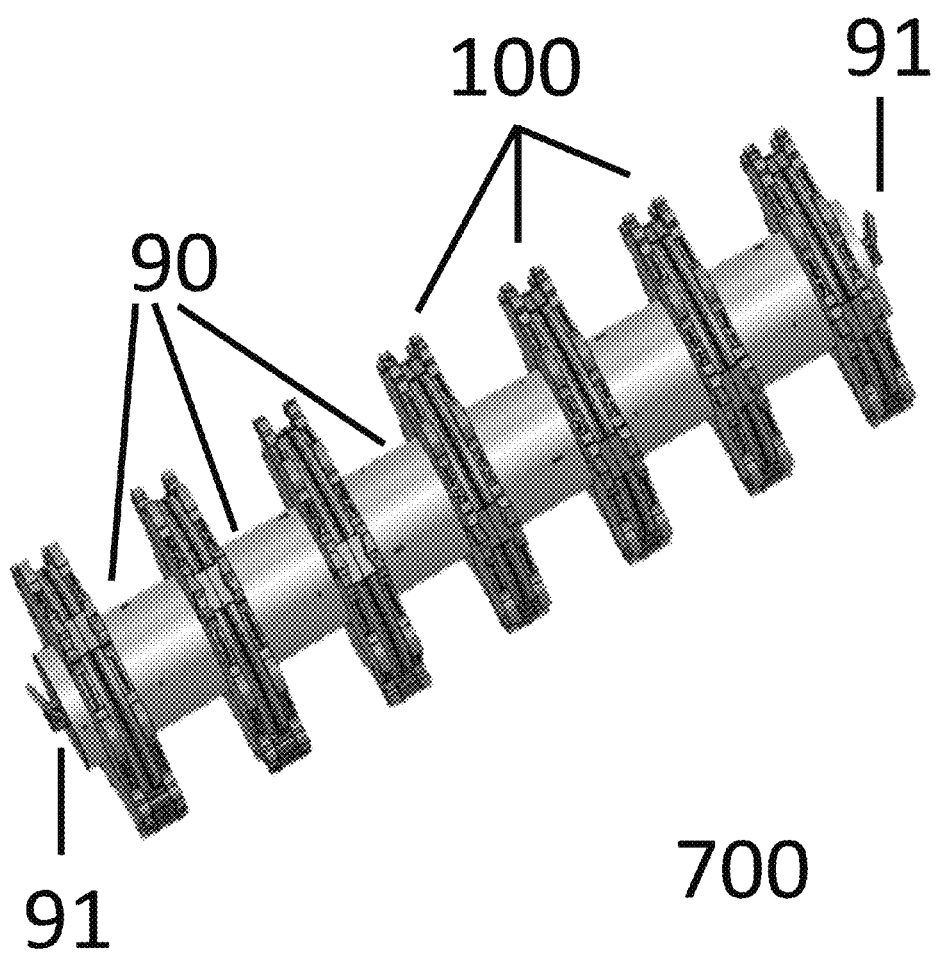
FIG. 8 is a view of a preferred embodiment as a hanging fender.

FIG. 8 shows yet another embodiment of the claimed invention as a hanging fender 700. Completely assembled fender 100 with assembly belt, buckle and buckle cover encircle a steel pipe 90 that is reinforced with rebar. The end caps 91 have a shackle for mounting fender with chains on a sea wall, dock face, or berth. The steel pipe and shackle can be treated for installation in the marine environment. Said treatment can be galvanized, can be painted, or otherwise treated to mitigate leaching of zinc and other pollutants in the marine environment.

The quadrant sections, tapered wedge, other member, buckle cover, and mechanical seal cord are comprised of a resilient material, which can be a synthetic elastomer, and can be certified as environmentally friendly.

The assembly belt can be fitted with an elastomer extrusion that is comprised of a non-scuffing, environmentally-friendly elastomer, which extends beyond the circumference of the fender assembly to function as a rub-rail.

The invention discloses a new marine fender for existing monopiles that is a suitable alternative to used tires, and relates to a method of assembly of a fender. The fender encircles a piling, and is comprised of four quadrant sections that are conjoined at mating surfaces with tapered wedges inserted into tapered mortises formed at interrelated surfaces. The method of assembly enables an articulated cam action joint action which dynamically interacts with kinetic impact energy. The fender does not require an assembly frame and can be installed on existing isolated and independent marine structures, such as monopiles and dolphins, with little or no modification of the structure. The preferred material is environmentally approved for use in the water. The fender can float and rotate and provides means to absorb, deflect, and dissipate substantial kinetic impact energy from multiple angles. The fender is environmentally friendly in its material as well as its installation and maintenance.

Although the claimed invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention.

There are of course many variants, and all such variants are contemplated. Accordingly, the claimed invention is not limited by the foregoing description or drawings, but is only limited by the scope of the appended claims.

What is claimed is:

1. A marine fender for absorption, deflection, and dissipation of kinetic impact energy resulting from a waterborne vessel berthing or otherwise engaging contact with a marine structure, and the fender, comprising:
   no more than four quadrant sections with mating surfaces; and no more than four tapered wedges.

2. The method of assembly of a marine fender comprising, four quadrant sections with mating surfaces and four tapered wedges, the method comprising:
   providing a mold for quadrant section half with cavities for internal air pockets, and with groove to accept and secure one side of a double-tongue mechanical seal cord;
   providing a mold for tapered wedge half with cavities for internal air pockets, and with groove to accept and secure one side of a double-tongue mechanical seal cord,
   fastening the quadrant section half each half to its identical half by introducing one-side of double-tongued mechanical seal cord into a groove present in one half and the other side of said tongue into the a groove present in the half, fastening identical halves of the tapered wedge in the same manner;
   securing the fender system with an assembly belt.

3. The method of assembly of claim 2 enables an articulated cam action joint when the tapered wedge is inserted into the tapered mortise that is formed at the conjoining mating surfaces of the quadrant sections.

4. The method of claim 2 wherein the assembly belt track comprises a continuous raised rib-like boss that convergently reinforces the mechanical seal of the quadrant sections.

* * * * *